United States Patent [19]

Duffy et al.

[11] Patent Number: 4,778,315

[45] Date of Patent: Oct. 18, 1988

[54] CHIP REMOVAL AND TOOL LUBRICATING DEVICE AND METHOD

[75] Inventors: James P. Duffy, Springfield; Robert M. Roberts, Glenolden; James C. Imbesi, Morton, all of Pa.

[73] Assignee: The Boeing Company, Seattle, Wash.

[21] Appl. No.: 911,950

[22] Filed: Sep. 26, 1986

[51] Int. Cl.[4] ............................................. B23Q 11/10
[52] U.S. Cl. .............................. 409/136; 29/DIG. 78; 29/DIG. 91; 82/DIG. 2; 408/61; 408/68; 409/137
[58] Field of Search .................. 409/136, 137; 408/61, 408/68; 82/DIG. 2; 29/DIG. 78, DIG. 87, DIG. 91

[56] References Cited

U.S. PATENT DOCUMENTS

| | | | |
|---|---|---|---|
| 2,723,405 | 11/1955 | Woodward | 408/61 |
| 3,868,195 | 2/1975 | Anderson et al. | 408/61 |
| 4,575,290 | 3/1986 | Adair | 409/137 X |

FOREIGN PATENT DOCUMENTS 0004646  1/1986  Japan .................................. 409/137

*Primary Examiner*—Z. R. Bilinsky
*Attorney, Agent, or Firm*—Jones, Tullar & Cooper

[57] ABSTRACT

A device and method for removing chips generated by a tool operating on a workpiece using air, and for lubricating the tool using a fluid lubricant are proposed. The device includes a manifold containing air and fluid lubricant chambers, at least one lubricating fluid nozzle connecting to the lubricating fluid chamber and at least two air nozzles connected to the air chamber. The nozzles are located so that the lubricating fluid stream is directed to impinge the tool from a given direction, and the air streams are directed so that neither the chips generated nor the air streams themselves significantly disrupt the lubricating liquid stream.

20 Claims, 3 Drawing Sheets

CHIP REMOVAL AND TOOL LUBRICATING DEVICE AND METHOD

FIELD OF THE INVENTION

The present invention relates in general to the field of machining and in particular to the functions of cleaning and lubricating associated with certain machining operations.

BACKGROUND AND RELATED ART

When milling pockets in metal fittings, for example, there is a tendency for the cut chips to build-up and remain in the pocket and around the cutter. This creates two problems which reduce the tool life of the cutter: re-cutting of existing chips occurs; and insufficient coolant reaches the cutting tool. As a result, the machine operator is required to manually blow chips out of the cutter area on a repetitive basis while shutting off or at least substantially reducing the speed of the cutting tool. If the operation involves heavy cutting (large chips), the machine will almost certainly have to be shut down in order to clear the chips away.

We are aware of several patented devices which serve a chip removing function. These are U.S. Pat. Nos. 2,686,440; 3,322,037 and 4,011,792.

We are also aware of several patented devices which serve a lubricating function. These are U.S. Pat. Nos. 1,452,779; 2,437,605 and 2,929,566.

SUMMARY OF THE INVENTION

A need exists for a device to be used in conjunction with a tool during operation of the tool to both lubricate the tool and remove chips as they develop. The device should be adaptable for mounting in proximity to the tool but with the capability of permitting easy access to the tool for, for example, tool changes.

The device should have structural simplicity, should not be limited to use with a particular tool and should be adaptable to the changing position of the tool relative to the work.

Such a tool has been developed and a preferred embodiment is described hereinafter.

The device according to the present invention fills the need noted above. It is structurally simple, i.e., has relatively few parts; it is operator compatible, i.e., it is easily installed to operate with the tool and can be readily adjusted for tool changing and for changes in the changing positions of the tool and workpiece on which it operates.

The device employs air for chip removal and any suitable liquid lubricant for cooling and lubrication. Included are at least two air nozzles and a lubricant discharging nozzle each attached to a common manifold which serves as a proximite source of both air and lubricant.

The nozzles are connected to the manifold for independent adjustment relative to the manifold, the tool and themselves. Practically, each nozzle is capable of a wide range of angular positions.

Another aspect of the invention resides in a method of effectively lubricating a tool during operation and removing the chips generated by the tool without disruption in the flow of lubricating liquid.

For this purpose a lubricating liquid stream and at least two converging air streams are employed. The lubricating liquid stream is directed to impinge the tool from a given direction, while the air streams are directed at the chip forming location from another direction so that neither the chips nor the air streams significantly disrupt the lubricating liquid stream.

BRIEF DESCRIPTION OF THE DRAWINGS

For a clearer understanding of the invention a preferred embodiment is illustrated by FIGS. 1-5. These five figures are sufficient to enable those in the relevant art to practice the invention. Included are.

DETAILED DESCRIPTION

The device according to a preferred embodiment of the present invention is used in conjunction with tools for drilling, milling or reaming, for example. It is intended for use with any tool which generates chips while operating on a workpiece.

Figure 1:
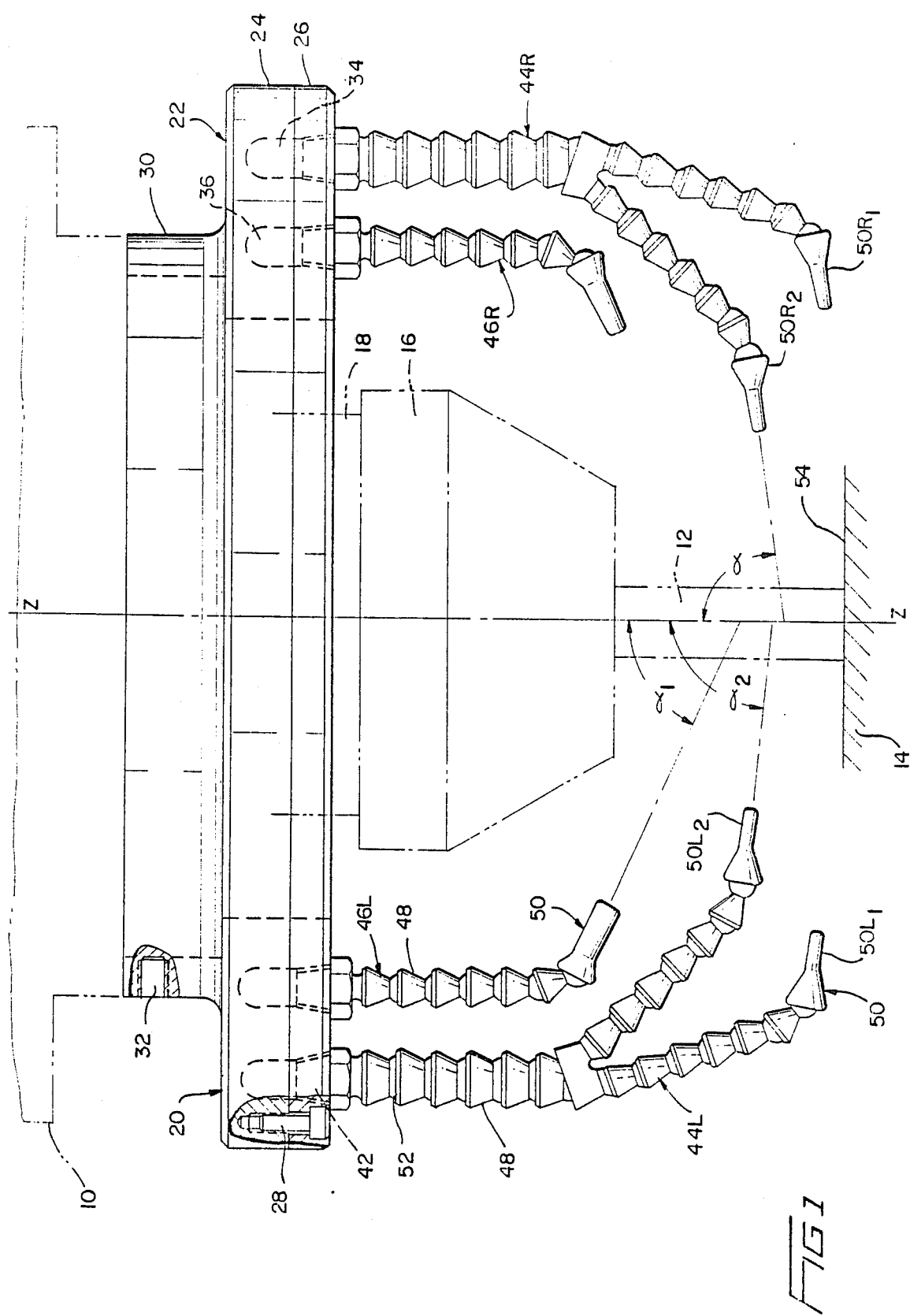
FIG. 1, which is an elevational view of the device according to a preferred embodiment of the invention.

The machine 10 shown in FIG. 1 includes a tool 12 which operates on a workpiece 14. The machine 10 can be an N/C milling machine, for example, and the tool 12 a mill cutter. The tool 12 is mounted on the machine 10 by a chuck 16, which, in turn is mounted to a spindle 18 of the machine 10. The tool 12 is displaced by the machine in the direction of the axis Z—Z, as well as in one or more directions normal thereto (Y—Y, X—X, for example) in order to perform its intended purpose with respect to the workpiece 14.

According to the present invention, a device 20 is provided for mounting to the machine 10 in proximity to the tool 12, and consequently moves along with the tool 12 during the operation thereof.

The device 20 includes a manifold 22 comprising an upper plate or chamber defining portion 24 and a lower plate 26 joined together by a series of screws 28. The upper plate includes a mounting flange 30 in which several set screws 32 are received for supporting the flange 30 on the machine 10.

The manifold 22 is preferably ring shaped (FIG. 2) having a center axis which coincides with axis Z—Z when the manifold is mounted to the machine 10 by the set screws 32.

Figure 2:
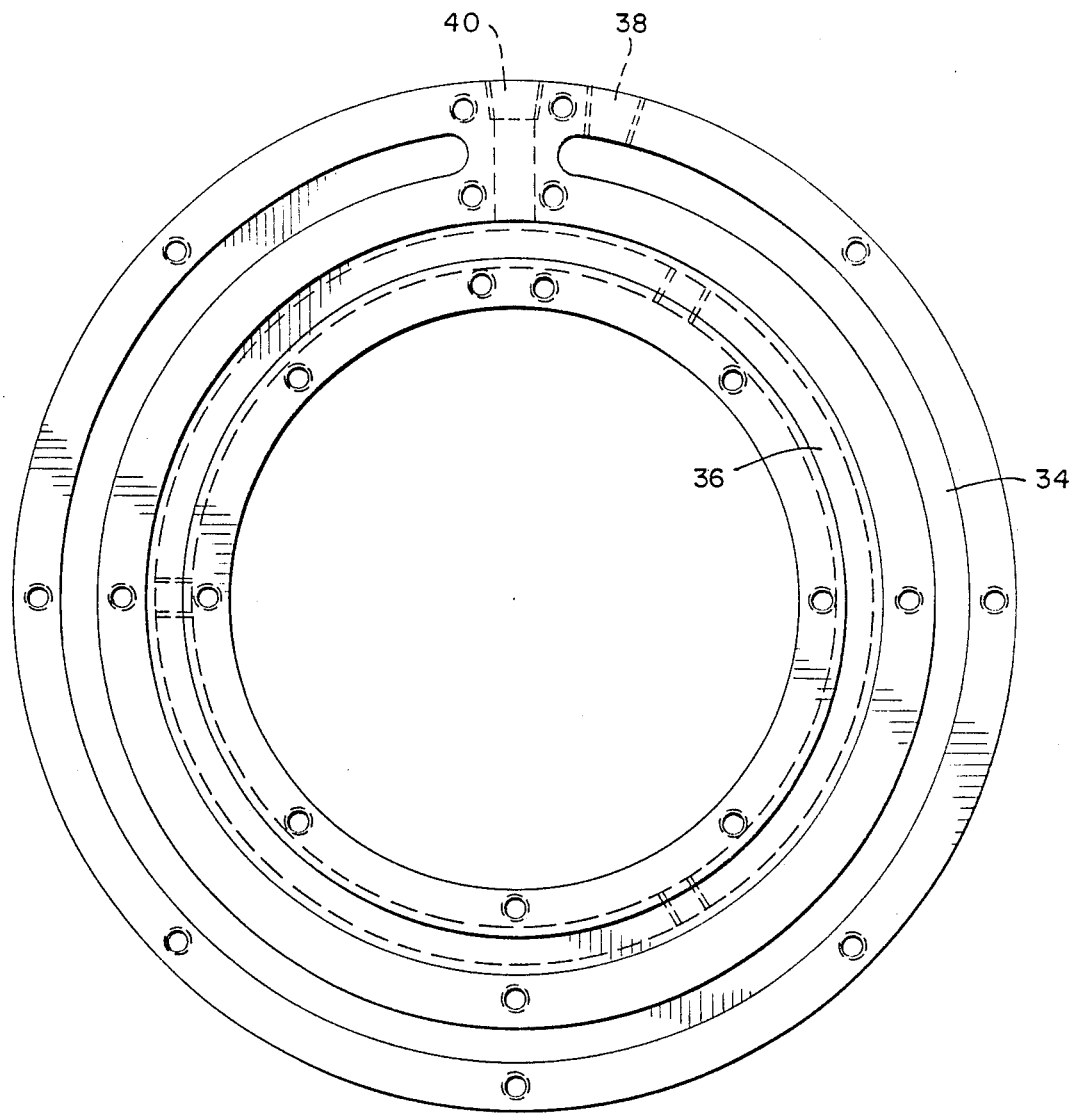
FIG. 2, which is a plan view of a portion of the manifold including both an air and lubricating chamber.

The chamber defining portion 24 has chambers 34 and 36 formed therein. These chambers are preferably concentrically arranged with respect to the center axis of the manifold 22. The chambers may be arcuate segments or they may extend about the chamber defining portion 24 as shown in FIG. 2, i.e., with the inner chamber 36 extending completely about the chamber defining portion 24 and the chamber 34 extending approximately 340° about the chamber defining portion 24. As shown in FIG. 2, ports 38 and 40 are formed in the chamber defining portion 24 for providing access to chambers 34 and 36, respectively.

The chambers 34 and 36 serve to contain the necessary fluids for the chip removal and tool lubricating function. For example, the chamber 34 can serve as the air chamber, while the chamber 36 can serve as the lubricating fluid chamber. Air pressure can be supplies to the air chamber 34 through port 38, while lubricating can be supplied to the chamber 36 through the port 40. The means for connecting the source of air pressure and lubricating fluids to their respective ports 38 and 40 is conventional and need not be shown or discussed in detail.

Figure 3:
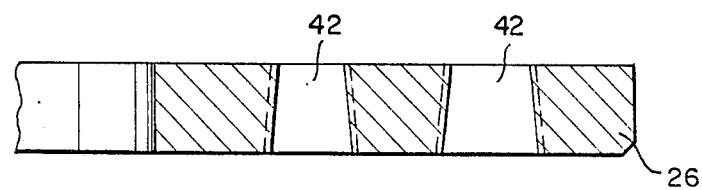
FIG. 3, which is a sectional view of a portion of the lower plate of the manifold shown in FIG. 2.

The lower plate 26 serves as a mounting or retaining plate for the nozzle assemblies shown in FIG. 1. For this purpose the lower or retaining plate 26 is provided with tapped holes 42 for each nozzle assembly. The relative location of the tapped holes is best shown in. FIG. 3. The end fittings screw into their respective tapped holes 42. In this way the nozzle assemblies can easily be installed and removed from the manifold.

The number of nozzle assemblies and corresponding tapped hole 42 is arbitrary. We have found that at least one nozzle assembly for supplying lubricating liquid and at least two nozzle assemblies for supplying air are desirable. The tapped holes 42 which are not in use can be plugged and the plug removed and a nozzle assembly inserted as desired.

When the lower or retaining plate 26 is joined to the upper plate 24 the tapped holes 42 align with a respective chamber 34 or 36 as shown in FIG. 1. In this way, the nozzle assemblies are provided with access to their respective chambers. To ensure that leakage does not occur between the two plates a suitable adhesive is applied to the mating surfaces of the two plates so that when they are joined by the screws 28, a sealed unit results.

Four nozzle assemblies, 44L, 44R, and 46L, 46R, are shown mounted to the lower or retaining plate 26 in communication with their respective chambers 34 and 36. Each nozzle assembly comprises a flexible locking type hose 48 made from high chemical resistance type plastic at the free end of which a nozzle 50 is mounted. The hoses comprise a series of swivel joints 52 which allow for a wide range of line adjustments. For example, the angles shown in FIG. 1, can be varied over a wide range.

The nozzle assemblies, 44L, 44R, each deliver a directed stream of air toward the intersection of the tool 12 and an interface 54 defined by the workpiece 14. Likewise, the nozzle assemblies 46L, 46R, deliver a directed stream of lubricating fluid against the tool 12. As can be seen in FIG. 1, the streams of lubricating fluid impinge against the tool 12 at a location closer to the chuck 16 than the interface 54. The air streams are directed toward the noted intersection where the chips are formed by the tool 12.

As previously noted, at least one lubricating fluid nozzle assembly is provided, and when only one is provided it would preferrably be located in the plane defined by the axis Z—Z, while at least two air nozzle assemblies are provided with one on each side of the axis Z—Z.

According to a preferred variant of the present invention the air nozzle assemblies are as shown in FIG. 1, i.e., each nozzle assembly includes a pair of nozzles in a Y configuration the two lower nozzles $50L_1$ and $50R_1$ can be directed at the intersection of the tool 12 and interface 54, while the two higher nozzles $50L_2$ and $50R_2$ can be directed above the interface plane.

Figure 4:
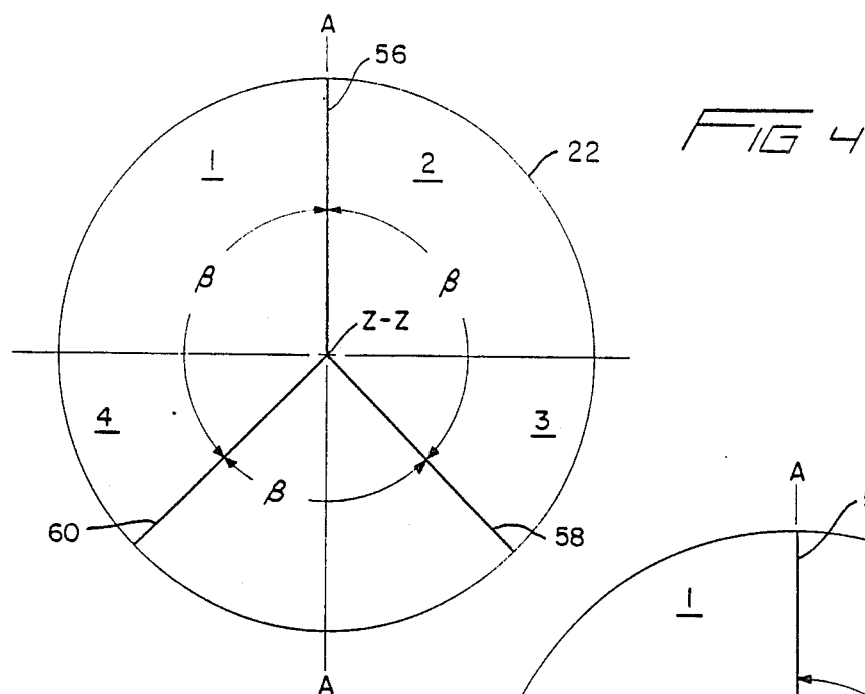
FIGS. 4 and 5, which are essentially geometrical illustrations of the stream directions and their angular relationships.
Figure 5:
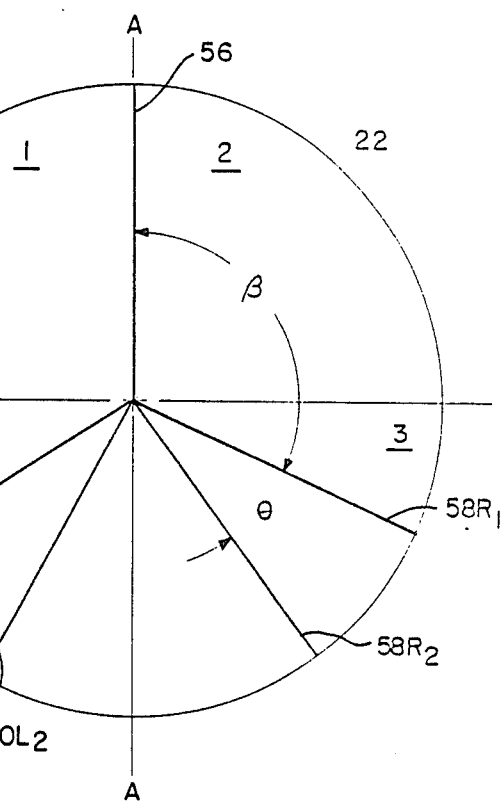

Referring to FIG. 4, an arrangement including a minimum number of nozzle assemblies is shown. The axes 56, 58 and 60 refer to the centerlines of directed fluid streams. The streams themselves are under pressure and the pressure can be controlled in any conventional manner. A lubricating fluid stream 56 emanating from a line 46L and at any angle $\alpha_1$ (FIG. 1), is shown directed along a coordinate axis between quadrants 1 and 2; while air streams 58 and 60, emanating from lines 44L and 44R and also at any angle $\alpha_2$ and $\alpha_3$ respectively (FIG. 1) are shown located in quadrants 3 and 4, respectively, and directed as shown on opposite sides of the center plane A—A defined by manifold 22. The angle $\beta$ between the directed streams is arbitrary and can be, for example, 120°. In addition, the streams 58 and 60 can each comprise two streams for which two nozzles are required (FIG. 1), the centerlines for which lie in a common vertical plane or in adjacent vertical planes. Toe latter is shown in FIG. 5, wherein $58R_1$, $58R_2$ and $60L_1$, $60L_2$ represent centerlines of the streams emanating from nozzles $50R_1$, $50R_2$ and $50L_1$ and $50L_2$, respectively. In this case, the angular relationship of $\beta$ and $\theta$ is also arbitrary.

With the arrangement shown, a high degree of flexibility is achieved in the inpingement location of the streams. Also, the nozzle assemblies are easy to adjust and can be readily moved by pivoting each assembly about any swivel joint. In this way, the assemblies can be moved to provide free access to the tool 12 when, for example, tool changes are desired.

Figure 6:
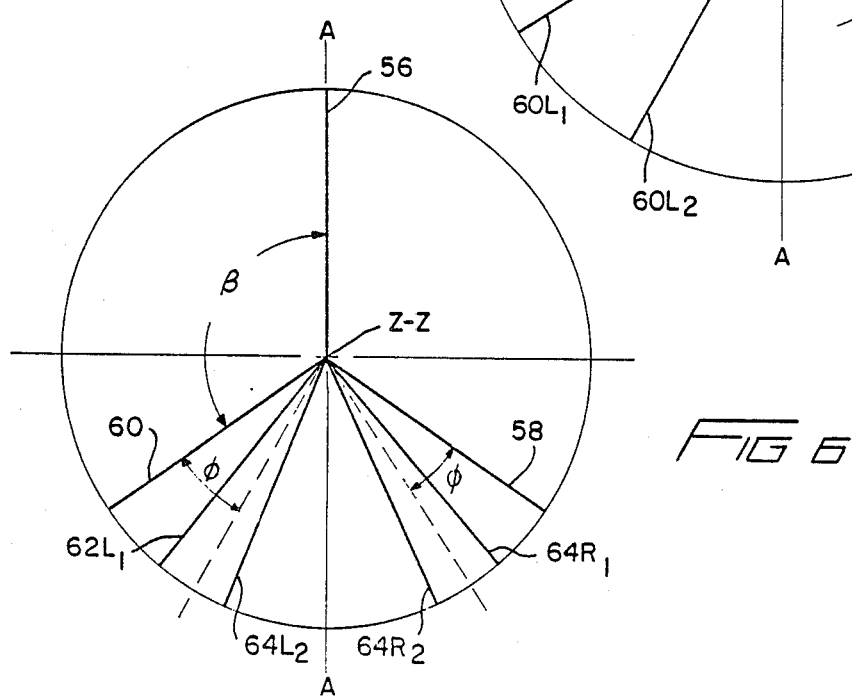
FIG. 6 which is also an essentially geometrical illustration of the stream directions for a prototype arrangement.

In an actual prototype model seven fluid streams were used. The centerlines are shown in FIG. 6. Three lubricating fluid steams and two air streams were used. The lubricating fluid streams are represented by axes 56, 58 and 60 with a $\beta=120°$. The air streams are represented by axes $62L_1$, $62L_2$ and $64R_1$, $64R_2$ with $\phi=10°$. The air streams each comprised two streams for which two nozzles are required (FIG. 1). The lubricating fluid streams each comprised one nozzle. The size of the three lubricating fluid streams lines was 0.250 in. inside diameter (FIG. 1). The two air stream lines each were 0.500 in. inside diameter and 0.250 in. inside diameter on each side of the "Y" reducer, and two 0.125 in. inside diameter nozzles (FIG. 1). The three lubricating fluid streams operated using the machines' supplied pressure, approximately 10–15 psi. On the other hand, the two air streams comprising four nozzles total, operating using supplied shop air of approximately 90 psi. Both a pressure regulator and an air valve were used to control the supplied shop air. Hence, both pressure and volume of the air could be adjusted to provide the best desirable effect on the unit's function.

What is claimed is:

1. A device for removing chips generated by a tool operating on a workpiece using air, and for lubricating the tool using a fluid lubricant, the tool defining a center axis, comprising:
   a manifold within which an air chamber and a lubricating fluid cahmber are defined, said manifold further defining a center plane which intersets the center axis defined by the tool;
   at least one lubricating fluid nozzle assembly connected to the lubricating fluid chamber of the manifold, and
   at least two air nozzle assemblies connected to the air chamber of the manifold, said air nozzle assemblies being located with at least one nozzle assembly on opposite sides of the center plane.

2. The device as defined in claim 1, wherein each lubricating fluid nozzle and an adjustable connecting line connecting the nozzle to the lubricating manifold, and wherein each air nozzle assembly includes at least one nozzle and an adjustable connecting line connecting the nozzles to the air chamber of the manifold.

3. The device as defined in claim 2, wherein each air nozzle assembly includes two nozzles which can be adjusted in their relative locations with respect to the tool.

4. A device for removing chips generated by a tool operating on a workpiece using air, and for lubricating the tool using a fluid lubricant, the tool defining a center axis and being mounted to a machine by mounting means, the device comprising:
   a manifold within which an air chamber and a lubricating fluid chamber are defined;
   means mounting the manifold to the mounting means for mounting the tool to the machine;
   at least one lubricating fluid nozzle for directing a lubricating fluid stream against the tool;
   a connecting line for each lubricating fluid nozzle connecting its respective lubricating fluid nozzle to the lubricating fluid chamber of the manifold;
   at least two air nozzles, each directing an air stream toward the tool;
   a connecting line for each nozzle for connecting its respective air nozzles to the air chamber of the manifold.

5. The device as defined in claim 4, wherein the manifold further defines a center plane which intersects the center axis defined by the tool, and wherein said air nozzles are located with at least one nozzle on opposite sides of the center plane.

6. The device as defined in claim 4, wherein the connecting lines for at least the air nozzles can be altered so that their respective nozzles can be adjusted in their relative locations with respect to the tool.

7. The device as defined in claim 4, wherein the connecting lines can be altered so that their respective nozzles can be adjusted in their relative locations with respect to the tool.

8. The device as defined in claim 4, wherein the manifold further defines a center plane, which intersects the center axis defined by the tool, said air nozzles are located with at least one nozzle on opposite sides of the center plane, and the connecting lines for at least the air nozzles can be altered so that their respective nozzles can be adjusted in their respective locations with respect to the tool and to the center plane.

9. The device as defined in claim 4, wherein the manifold further defines a center plane which intersects the center axis defined by the tool, two air nozzles being provided located with at least one nozzle on opposite sides of the center plane, a single lubricating fluid nozzle being provided and located so that the center line of its fluid stream lies in the center plane, and wherein the connecting lines for at least the air nozzles can be altered so that their respective nozzles cna be adjusted in their relative locations with respect to the tool and the center plane.

10. The device as defined in claim 9, wherein the connecting line of the lubricating fluid nozzle can be altered so that the lubricating fluid nozzle can be adjusted with respect to the tool and the center plane.

11. The device as defined in claim 4, wherein the manifold is ring shaped and defines a center axis which is coincident with the center axis of the tool when the manifold is mounted to the tool mounting means, said chambers being arranged concentrically with respect to the center axis.

12. The device as defined in claim 11, wherein the manifold includes retaining means for receiving the ends of the connecting lines opposite to their nozzle ends and thereby communicating the received ends of the connecting lines with their respective chamber.

13. The device as defined in claim 12, wherein the manifold includes a chamber defining portion, and a retaining plate and means for connecting the two, and wherein the retaining means are formed in the retaining plate and communicate with a respective chamber.

14. The device as defined in claim 13, wherein the connecting lines for at least the air nozzles can be centered so that their respective locations with respect to the tool.

15. The device as defined in claim 13, wherein the connecting lines can be altered so that their respective nozzles can be adjusted in their relative locations with respect to the tool.

16. A method of removing chips generated by a tool operating on a workpiece at an interface of the tool and workpiece, using air, and for lubricating the tool using a fluid lubricant, comprising the steps of:
   forming at least one lubricating fluid stream and directing it against the tool; and
   forming at least two air streams and directing them to the interface of the tool and workpiece where the chips are generated, wherein the lubricating fluid stream impinges the tool above said interface.

17. The method as defined in claim 16, wherein the air streams converge at said interface.

18. The method as defined in claims 16, wherein the direction of each air stream is adjustable with respect to the tool.

19. The method as defined in claim 16, wherein the direction of each stream is adjustable with respect to the tool.

20. A device for removing chips generated by a tool operating on a workpiece using air, and for lubricating the tool using a fluid lubricant, comprising:
   a source of air;
   a source of fluid lubricant;
   at least one lubricating fluid nozzle assembly connected to the source of fluid lubricant; and
   at least two air nozzle assemblies connected to the source of air, said air nozzle assemblies being located with at least one nozzle assembly on opposite sides of the lubricating fluid nozzle assembly.

* * * * *